(12) United States Patent
Froggatt et al.

(10) Patent No.: US 7,379,168 B2
(45) Date of Patent: May 27, 2008

(54) POLARIZATION DIVERSITY DETECTION WITHOUT A POLARIZING BEAM SPLITTER

(75) Inventors: Mark E Froggatt, Blacksburg, VA (US); Brian J Soller, Blacksburg, VA (US); Matthew S Wolfe, Christiansburg, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 307 days.

(21) Appl. No.: 10/520,819

(22) PCT Filed: Jul. 8, 2003

(86) PCT No.: PCT/US03/21336

§ 371 (c)(1),
(2), (4) Date: Jul. 26, 2005

(87) PCT Pub. No.: WO2004/005973

PCT Pub. Date: Jan. 15, 2004

(65) Prior Publication Data

US 2006/0164627 A1 Jul. 27, 2006
US 2008/0007718 A9 Jan. 10, 2008

Related U.S. Application Data

(60) Provisional application No. 60/394,260, filed on Jul. 9, 2002.

(51) Int. Cl.
*G01N 21/00* (2006.01)
(52) U.S. Cl. .................................................. 356/73.1
(58) Field of Classification Search .................... None
See application file for complete search history.

(56) References Cited

U.S. PATENT DOCUMENTS

| 4,397,551 | A | 8/1983 | Bage et al. | |
|---|---|---|---|---|
| 5,321,501 | A | * | 6/1994 | Swanson et al. ............ 356/479 |
| 5,789,521 | A | 8/1998 | Marrocco, III et al. | |
| 6,008,487 | A | 12/1999 | Tachikawa et al. | |
| 6,111,676 | A | 8/2000 | Lemus et al. | |
| 6,376,830 | B1 | 4/2002 | Froggatt et al. | |
| 6,608,717 | B1 | 8/2003 | Medford et al. | |
| 6,856,400 | B1 | 2/2005 | Froggatt | |

OTHER PUBLICATIONS

U.S. Appl. No. 10,520,818, filed Jul. 25, 2005, Mark Froggatt et al.
International Search Report.

* cited by examiner

*Primary Examiner*—Tu T Nguyen
(74) *Attorney, Agent, or Firm*—Nixon & Vanderhye

(57) ABSTRACT

A fiber optic measurement device including an optical frequency domain reflectometer (OFDR) performs polarization diversity detection without using a polarizing beam splitter.

19 Claims, 5 Drawing Sheets

POLARIZATION DIVERSITY DETECTION WITHOUT A POLARIZING BEAM SPLITTER

CLAIM OF BENEFIT OF PROVISIONAL PATENT APPLICATION

Priority is claimed from U.S. Provisional Patent Application No. 60/394,260, filed on Jul. 9, 2002. The contents of this provisional application are incorporated by reference.

This application is the US national phase of international application PCT/US2003/021336 filed Jul. 8, 2003, the entire content of which is hereby incorporated by reference.

RELATED APPLICATIONS

This application is related to commonly-assigned U.S. application Ser. No. 10/520,818, entitled "Heterodyne Optical Spectrum Analyzer," filed on Jul. 8, 2003, and to commonly-assigned, U.S. patent application Ser. No. 10/005,819, entitled "Apparatus and Method for the Complete Characterization of Optical Devices Including Loss, Birefringence, and Dispersion Effects," filed on Dec. 14, 2001, now U.S. Pat. No. 6,856,400.

FIELD OF THE INVENTION

The present invention relates to optical measurements, and more particularly, to a device and method for performing polarization diversity detection.

BACKGROUND AND SUMMARY

Mixing between a reference signal and a data signal is often necessary to extract information about an optical device. A probe signal and a reference signal originating from the same source are typically mixed, resulting in fringes that can be detected and used to assess information about the device being probed. In interferometric sensing, a reference signal is mixed with a signal whose phase and/or amplitude is modified by a parameter to be measured.

The mixing produces an interference signal, and the amplitude of the interference signal depends on how efficiently the two optical signals mix. When the two signals have the same polarization state, the mixing efficiency is 100%. When the two signals have orthogonal polarization states, no mixing occurs—0% efficiency. Between these two limits, only the portion of the signals whose polarization states resolve onto a single polarization axis actually mix. The reduced, mixed-signal amplitude results from an unmixed component in an orthogonal polarization state. This inefficiency is usually referred to as polarization induced fringe fading.

Polarization diversity detection overcomes polarization induced fading. One commonly known interferometric scheme that can suffer from polarization fading is Optical Frequency Domain Reflectometry (OFDR). OFDR injects a highly monochromatic beam of light into the optical system or device to be tested. The frequency of that light is varied slowly with a time-linear sweep, and the optical signal back-scattered from the optical system is detected by coherently mixing the back-scattered signal with the reference input signal. The beat frequency component of the mixed signal, (corresponding to an interference signal), is measured to determine a position of the back-scattering (reflection) point in the optical system/fiber. The interference signal amplitude also determines a back-scattering factor and an attenuation factor for the reflected light.

U.S. Pat. Nos. 6,376,830 and 5,789,521 provide further details regarding OFDR measurement and are incorporated herein by reference. Reference may also be made to commonly-assigned, U.S. patent application Ser. No. 10/005,819, entitled "Apparatus and Method for the Complete Characterization of Optical Devices Including Loss, Birefringence, and Dispersion Effects," filed on Dec. 14, 2001.

A single mode optical fiber supports two degenerate polarization modes. This degeneracy causes field energy to be transferred between the modes as they propagate down the fiber. This phenomenon causes the polarization fading in fiber-optic interferometers. FIG. 1 shows schematically a Mach-Zender interferometer. The arrows denote electric field (E) vector components. Polarization fading occurs whenever $E_1$ and $E_2$ are not co-linear, i.e., $\vec{E}_1 \cdot \vec{E}_2 = |\vec{E}_1\| \vec{E}_2|\cos\theta$, $\theta \neq 0$. The power measured at the detector is proportional to the square of the absolute value of $(E_1+E_2)$. The interference terms of this relationship are proportional to $E_1 \cdot E_2^* + E_2 \cdot E_1^*$, where * denotes a complex conjugate. When a first coupler C1 splits the input field $E_{in}$, there is a chance that the split fields $E_1$ and $E_2$ in the respective interferometer arms evolve into orthogonal polarizations. As described above, in that situation, no interference fringes will be detected, and there is complete polarization fading or 0% mixing efficiency.

A worst case scenario in which the fields interfering on the detector, $E_1$ and $E_2$, are orthogonal is shown in FIG. 2. More formally, in some orthogonal basis, the fields can be written $E1=(a, 0)\exp(i\omega\tau)$ and $E_2=(0, d)$, where $\tau$ is the propagation time difference between the two interferometer arms ($\tau=n_e L/c$, where $n_e$ is the effective (modal) index of the fiber. The basis of a vector set includes two vectors in two dimensions or three vectors in three dimensions that are used to represent all other possible vectors. Knowing the basis of a vector set is essentially the same as knowing the coordinate system for a point in space. For example, a location may be described as being at 32 degrees North and 25 degrees West. The coordinate system is the set of latitude and longitude lines on the Earth, and the particular location is understood. The basis set is a pair of vectors, each one degree (60 nautical miles) long, with one vector pointed to the North and one vector pointed to the West.

Now in the S-P basis set, shown in FIG. 2 as orthogonal, the fields can be written as $E_1=(a', b')\exp(i\omega\tau)$ and $E_2=(c', d')$ so $E_1 \cdot E_2=0$, but $E_1+E_2=(a' \exp(i\omega\tau)+c', b' \exp(i\omega\tau)+d')$. Polarization diversity detection detects the s and p components (or projections onto the s and p axes) of $E_1+E_2$ separately using two S and P detectors. The power at each detector is proportional to the modulus squared of the components of the total field:

$$P_s \propto |a'\exp(i\omega\tau)+c'|^2 \qquad (1)$$

$$P_p \propto |b'\exp(i\omega\tau)+d'|^2 \qquad (2)$$

These diversity power signals exhibit fringes even though the total field, i.e., the sum of two orthogonal fields, does not.

Polarization diversity detection may be implemented using a polarizing beam splitter (PBS) as show in FIG. 3. If the field at the PBS is $E_{bs}$ and is given by $E_{bs}=(A, B)$ in the basis set of the polarizing beam splitter, then the measured powers at the S and P detectors are $P_s \propto |A|^2$ and $P_p \propto |B|^2$. When the PBS splits the field into different components, the crystalline structure of the PBS imposes an orthonormal basis onto which the incident field is projected. That orthonormal basis is needed to extract information contained in the $E_1$ and $E_2$ amplitudes.

But there are drawbacks with using polarizing beam splitters. First, they are bulky and expensive. Second, polarizing beam splitters add stray reflections to the detected signals. Third, if the polarizing beam splitter is designed to operate in a particular wavelength, e.g., 1500 nm, it cannot be easily and inexpensively altered to operate at a non-standard wavelength, such as 800 nm, at least as compared to a standard optical coupler. For these and other reasons, it is an object of the present invention to perform polarization diversity detection without a polarizing beam splitter.

The present invention performs polarization diversity detection without using a polarizing beam splitter. Field vectors from one interferometer arm are used as the basis upon which to project a field vector from the other interferometer arm. Polarization diversity detection is performed using only standard optical couplers, e.g., 50-50 couplers. A polarization beam splitter is not needed.

A first coupler receives a first optical signal from a device or system under test and generates first and second coupler outputs. A second coupler receives a second optical signal from a reference source and generates third and fourth coupler outputs. A first polarization controller (PC) changes the polarization state of the third coupler output and generates a PC output. A third coupler generates a first combined output from the first coupler output and the PC output. A fourth coupler generates a second combined output from the second coupler output and the fourth coupler output. A first detector detects a first power of the first combined output in a first projection plane, and a second detector detects a second power of the second combined output in a second projection plane. A processor processes interference terms in the first and second powers in the first and second projection planes to determine one or more characteristics of the first optical signal.

A second polarization controller changes the polarization of the first optical signal before it is received in the first optical coupler. The first and second polarization controllers are adjusted to calibrate the fiber optic measurement device. Different second polarization controller settings result in multiple corresponding vector measurements at the first and second detectors. The processor calculates a vector calibration matrix using these vector measurements. The processor corrects subsequent detected vector measurements using the vector calibration matrix. The corrected vector measurements ensure that the vector representation of the first optical signal are in an ortho-normal basis set.

The OFDR components can be constructed simply using optical fiber, and if desired, from the same type of standard low-loss fiber. Matching the type of fiber throughout the optical network results in very low losses with essentially zero scattering events in the network. As a result, the OFDR produces very clean time domain measurements (only reflection events from the device under test appear).

Another advantage of fiber-based OFDR construction is significant cost reduction and increased reliability and flexibility. A polarization controller can be implemented simply as a single loop of fiber that is moved to achieve a certain polarization state at the output. Once the loop is positioned, it need not be moved again. Couplers are constructed by melting two optical fibers together. In order to manufacture couplers for operation at widely different wavelengths, (e.g., 615 nm and 1550 nm), coupler manufacturers need only purchase fiber (an inexpensive commodity) designed for that wavelength and melt two sections together using the same process for all wavelengths. No re-tooling or significant changes to the process are required. As a result, couplers are readily available at all wavelengths at a reasonable price in contrast to polarization beam splitters and other bulk-optic based optical components.

Other features, aspects, and advantages will become apparent from the following detailed description, taken in conjunction with the accompanying drawings, illustrated by way of example. Like reference symbols refer to like elements throughout.

DETAILED DESCRIPTION OF THE INVENTION

The following description, for purposes of explanation not limitation, sets forth specific details, such as particular components, electronic circuitry, techniques, etc. But it will be apparent to one skilled in the art that the present technology may be practiced in other embodiments that depart from these specific details. In other instances, detailed descriptions of well-known methods, devices, and techniques, etc. are omitted so as not to obscure the description with unnecessary detail. Individual function blocks are shown in the figures. Those skilled in the art will appreciate that functions may be implemented using discrete components or multi-function hardware. Processing functions may be implemented using a programmed microprocessor or general-purpose computer, using an application specific integrated circuit (ASIC), andlor using one or more digital signal processors (DSPs).

Figure 1:
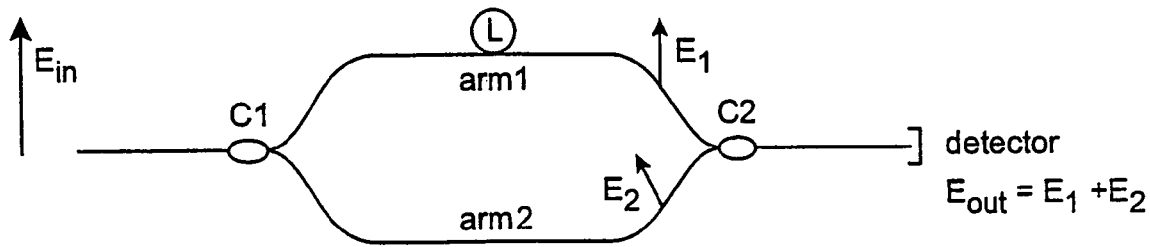
FIG. 1 illustrates a Mach-Zender interferometer.
Figure 2:
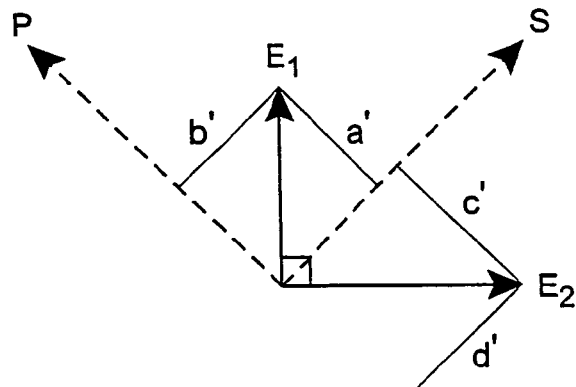
FIG. 2 illustrates orthogonal measurement field vectors $E_1$ and $E_2$ and two basis vectors S and P.
Figure 3:
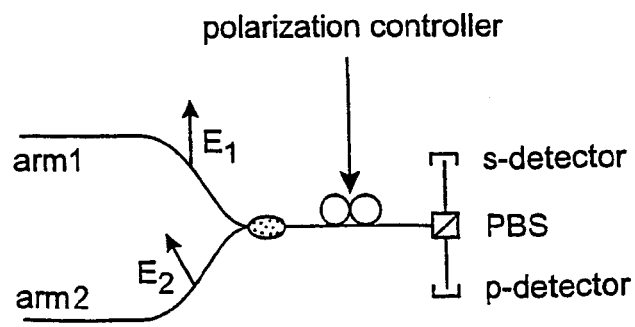
FIG. 3 illustrates a Mach-Zender interferometer with a polarization beam splitter.
Figure 4:
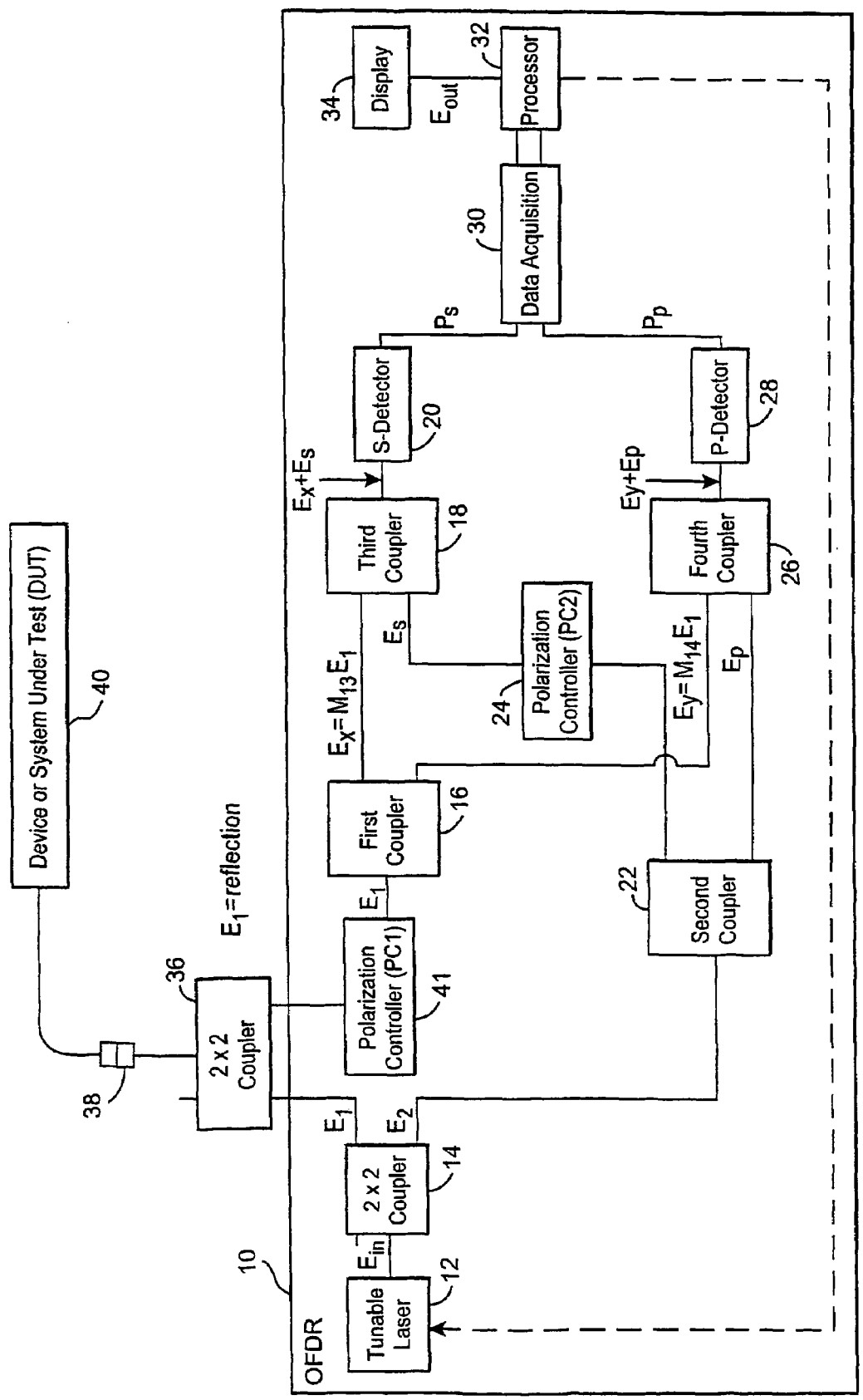
FIG. 4 illustrates in function block format an optical frequency domain reflectometer (OFDR) for polarization diversity detection without a polarization beam splitter.

A first, non-limiting, example OFDR embodiment that does not employ a polarizing beam splitter is described in conjunction with FIG. 4. An OFDR 10 includes a tunable laser 12 for generating an electric field at a particular frequency (controlled by the frequency sweep signal from processor 32) provided to a standard optical coupler 14. Any such coupler may be employed, and one non-limiting example is Gould part number 23-40355-33-01201 manufactured by Gould Fiber Optics Division of Gould Electronics of Baltimore, Md. Coupler 14 splits the input field $E_{IN}$ into two electric field signals $E_1$ and $E_2$. $E_1$ is provided through optical coupler 36 and connector 38 to a device or system under test (DUT) 40. A back-scattered signal $E_1$ to be measured as a function of its reflection point along the fiber is provided through coupler 36 to a first coupler 16.

The reference signal $E_2$ is provided to a second coupler 22. A polarization state of a first output of coupler 22 is changed in polarization controller 24. The output of polarization controller 24 is the reference signal $E_2$ in a first reference plane denoted "S" so that this reference signal is referred to as $E_S$. The second output of coupler 22 corresponds to the reference signal in another reference plane labeled "P" so that this signal is denoted $E_P$. The first output of coupler 16 is $E_X$ and equals $M_{13}E_1$ as described below. The second output of coupler 16 is $E_Y$ and equals $M_{14}E_1$.

The couplers 18 and 26 output the signals $E_X+E_S$ and $E_Y+E_P$, respectively, which are detected by respective detectors 20 and 28. The output of S-detector 20 is a power $P_S$, and the output of P-detector 28 is a power $P_P$. Both powers are provided to a data acquisition unit 30 which provides digital information to processor 32. The processor 32 processes the information and generates the desired electric field output signal $E_{OUT}$ which is then provided to a display 34 to display one or more parameters of $E_{OUT}$. Such parameters may include amplitude and phase of the scattered light and the particular location at which the reflection occurs. Processor 32 sweeps the tunable laser 12 through a particular sweep range specified by a starting wavelength and a finishing wavelength, e.g., 1540 nm-1580 nm.

Figure 5:
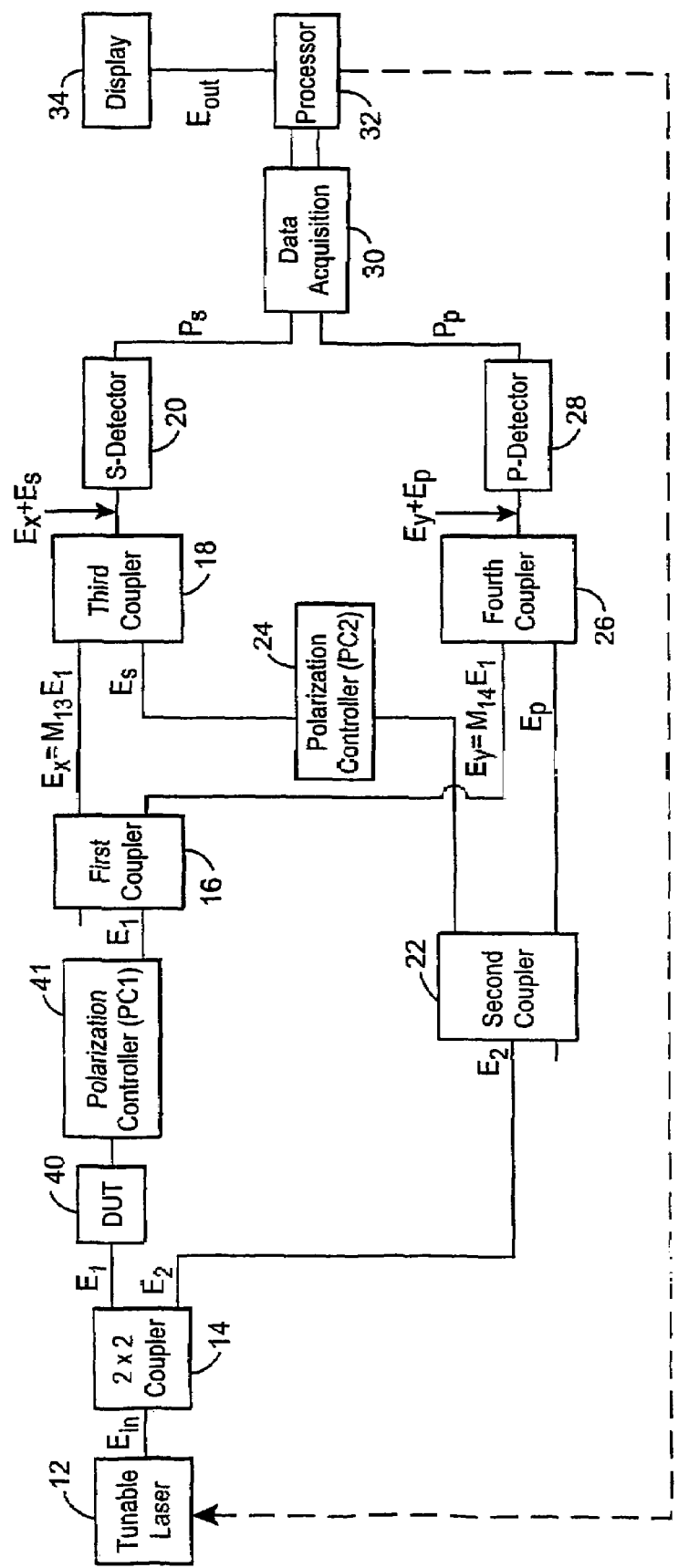
FIG. 5 illustrates a different configuration of the OFDR shown in FIG. 4.

FIG. 5 illustrates another example embodiment with a slightly different configuration in which the device under test 40 is coupled directly to the output of the coupler 14. Both embodiments employ a polarization controller 42 used in calibrating the OFDR 10 as will be later described.

Figure 6:
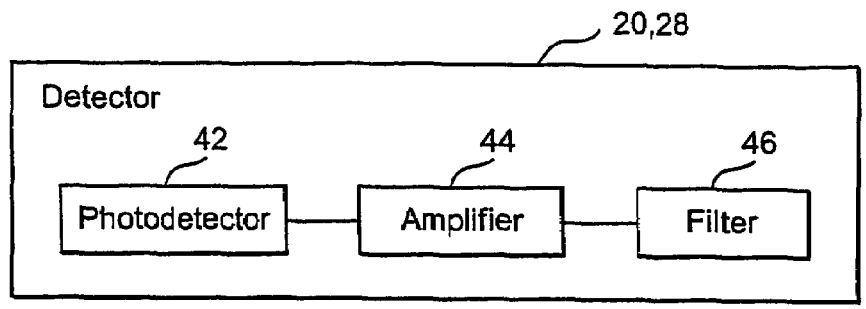
FIG. 6 illustrates in further detail the detectors shown in FIGS. 4 and 5.
Figure 7:
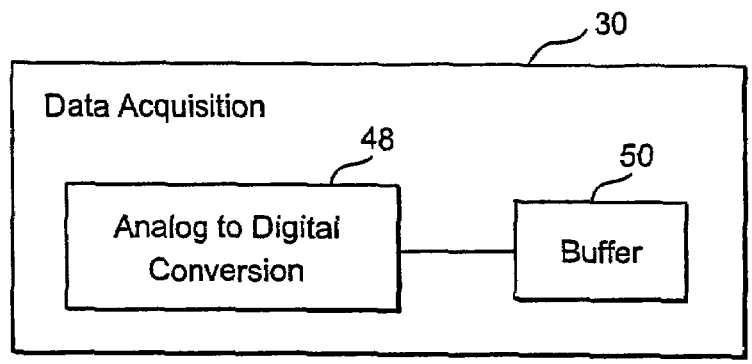
FIG. 7 illustrates in further detail the data acquisition block in FIGS. 4 and 5.

The detectors 20 and 28 are illustrated in further detail in FIG. 6. Any suitable detector may be employed, and one non-limiting example is a ThorLabs PDA 400 optical detector manufactured by ThorLabs of Newton, N.J. Each detector includes a photodetector 42 and an amplifier 44 coupled to a low-pass filter 46. The data acquisition block 30 includes an analog-to-digital conversion block 48 coupled to a buffer 50. The filtered output from the detector is converted into a digital format by the digital-to-analog conversion means 48, and the digital signal is stored in the buffer 50 before being processed by the data processor 32.

Figure 8:
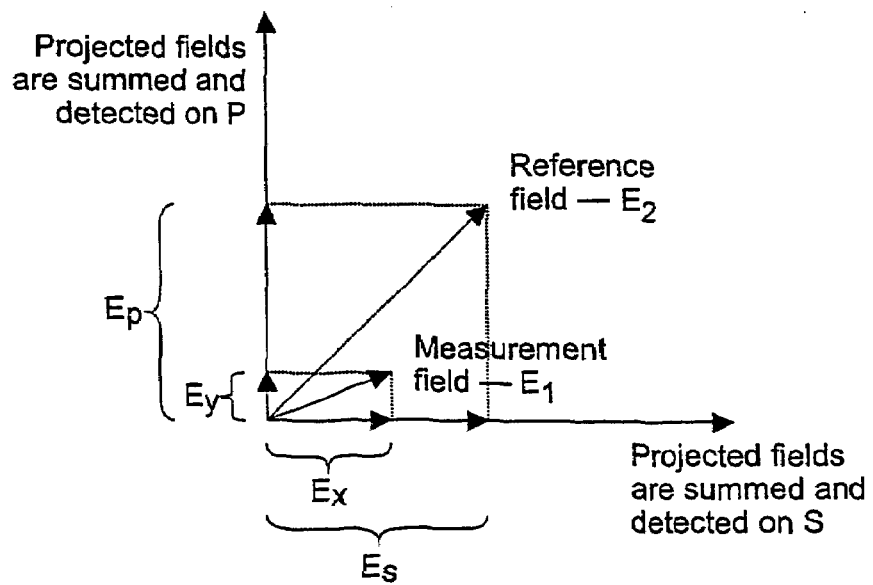
FIG. 8 is a vector diagram showing the measurement field vector $E_1$ and reference field vector $E_2$ each being projected and summed on each of the basis axes S and P in accordance with projections implemented by a polarization beam splitter.

The vector diagram in FIG. 8 shows projected fields on the S and P power detector reference planes. The reference fields S and P are assumed orthogonal—a reasonable assumption if a PBS is used. The S component or projection of the measured field $E_1$ is denoted $E_X$ on the horizontal axis, and the P component or projection of the measured field $E_1$ is denoted $E_Y$ along the vertical axis. The reference field $E_2$ is also projected onto the S and P axes. The sum of $E_X$ and $E_S$ is detected on the S detector 20, and the sum of the projections $E_P$ and $E_Y$ is detected on the P detector 28.

Figure 9:
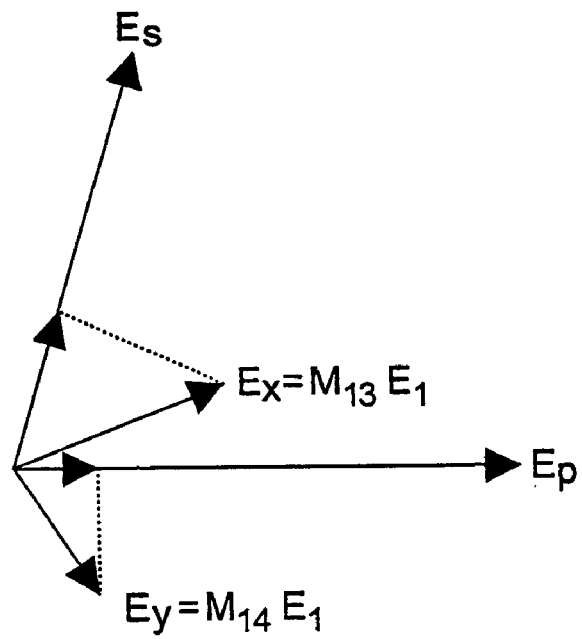
FIG. 9 is a similar vector diagram for the all coupler OFDR implementations found in FIGS. 4 and 5.

But when the two fields $E_1$ and $E_2$ are detected by the coupler pair 16 and 22, the S and P axes cannot be assumed to be orthogonal or even the same length. Although the interference takes place at two separate detectors between signals traveling significantly different paths, that interference can be represented as the projection of the original signal of interest E1 onto two non-parallel vectors. To account for the non-orthonormal basis, $E_1$ is altered by two transforming matrices $M_{13}$ and $M_{14}$ prior to being projected onto the reference fields $E_S$ and $E_P$ as shown in FIG. 9. So long as the two transforming matrixes $M_{13}$ and $M_{14}$ do not vary with time, this is an acceptable transformation.

Figure 10:
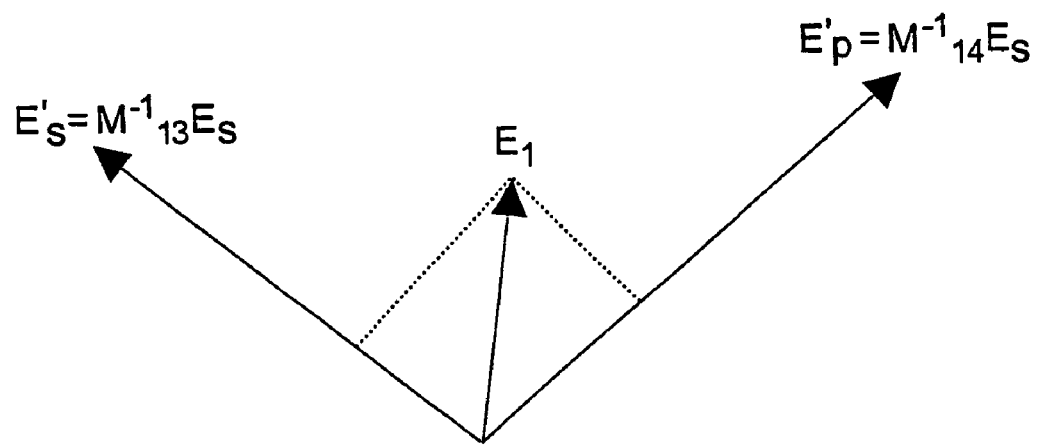
FIG. 10 is a vector projector diagram showing $E_1$ projected onto virtual reference fields $E'_S$ and $E'_P$.

Rather than the projection of $E_1$ onto the S and P axes, FIG. 9 shows the projection of $E_X$ onto $E_S$ and the projection of $E_Y$ onto $E_P$. Even though the transforming matrices $M_{13}$ and $M_{14}$ are unknown, the reference fields $E_S$ and $E_P$ may still be transformed in a precise way that allows the detected fields as projections of $E_1$ onto some set of vectors. This is illustrated in FIG. 10 in which $E_1$ is projected onto two non-parallel vectors $E'_S=M^{-1}_{13} E_S$ and $E'_P=M^{-1}_{14} E_S$. As will be demonstrated below, $E_1$ can be recovered from these projections shown in FIG. 10 using a linear mathematical transformation.

The propagation of a field in an optical fiber from one location to another through any linear section of the system (e.g., optical fiber, optical component, etc.) can be represented by a complex 2×2 matrix. This matrix will account for all effects of the linear section including loss, polarization rotation, and polarization-dependent loss. Let the propagation from coupler i to coupler j (i, j=1,2,3,4) be represented by the matrix $M_{ij}$. We therefore have $\overline{E}_x=M_{13}\overline{E}_1$ and $\overline{E}_y=M_{14}\overline{E}_1$. The interference terms measured at the S- and P-detectors 20 and 28 are proportional to $$P_s \propto \overline{E}_x \cdot \overline{s} + \overline{E}_x^* \cdot \overline{s} = M_{13}\overline{E}_1 \cdot \overline{s} + (M_{13}\overline{E}_1)^* \cdot \overline{s}, \quad (3)$$

$$P_p \propto \overline{E}_y \cdot \overline{p} + \overline{E}_y^* \cdot \overline{p} = M_{14}\overline{E}_1 \cdot \overline{p} + (M_{14}\overline{E}_1)^* \cdot \overline{p}. \quad (4)$$

As described, without a polarizing beam splitter, the vectors S and P no longer form an orthonormnal basis. But knowledge of the amplitude and relative angle between the vectors S and P allows the reconstruction of $E_1$ in an orthogonal basis.

From Eqs. (3) and (4), it is seen that the detector power measurements of $P_s$ and $P_p$ project the vectors $M_{13}\overline{E}_1$ and $M_{14}\overline{E}_1$ into the S—P basis. The fact that the basis-vectors S and P are arbitrary allows use of the identity, $\overline{x} \cdot (M\overline{y})=\overline{y} \cdot (M^t \overline{x})$, where x and y are arbitrary vectors, M is an arbitrary matrix, and $M^t$ is the transpose of matrix M, to write the following:

$$(M_{13}\overline{E}_1)\cdot\overline{s}=\overline{E}_1\cdot(M_{13}\overline{s}^*)=\overline{E}_1\cdot\overline{s}' \quad (5)$$

$$(M_{14}\overline{E}_1)\cdot\overline{p}=\overline{E}_1\cdot(M_{14}\overline{p}^*)=\overline{E}_1\cdot\overline{p}' \quad (6)$$

The vectors $\overline{s}'$ and $\overline{p}'$ act as the basis vectors onto which $E_1$ is projected. Knowledge of the amplitudes of and relative angle between $\overline{s}'$ and $\overline{p}'$ allows the projection of $E_1$ onto an orthogonal basis set. What is required is a process by which this correcting matrix can be quickly and efficiently found to transform the measurements into an ortho-normal basis set.

Power measurements at the S and P detectors yield information about the vector field $\overline{E}=\overline{E}_x+\overline{E}_y$ in the S—P basis set. Those measurements are of the form $$P_s=|E_x|^2+|s|^2+2E_x s \cos \phi_x \quad (7)$$

$$P_p=|E_y|^2+|p|^2+2E_y p \cos \phi_y \quad (8)$$

Omitting dc components, we can form the vector, $\overline{v}=(2E_x s \cos \phi_x, 2E_y p \cos \phi_y)=(E_s, E_p)$. But again $E_s$ and $E_p$ are not orthogonal. To remedy this, a calibration matrix, M, is determined. When it is multiplied by v, the product gives a new vector E that represents the field $E_1$ in a calibrated, orthogonal basis.

The calibration begins by adjusting the polarization controllers $PC_1$ and $PC_2$ (41 and 24). With the reference laser 12 in the continuous sweep mode, $PC_1$ is adjusted so that the fringes observed on the P-detector 28 are maximized. When this is accomplished, the fringes on the S-detector 20 are minimized by adjusting $PC_1$. When this is accomplished, $PC_1$ is adjusted so the fringe levels on the S- and P-detectors are approximately equal (to within ±10%).

Once the polarization controllers $PC_1$ and $PC_2$ are adjusted, the OFDR can be calibrated by taking measurements of $\bar{v}=(2E_x s \cos \phi_x, 2E_y p \cos \phi_y)$ for four distinct but random settings of $PC_1$. The following represent these measurements:

$$\bar{v}_1 = \begin{pmatrix} E_{s1} \\ E_{p1} \end{pmatrix}, \quad \bar{v}_2 = \begin{pmatrix} E_{s2} \\ E_{p2} \end{pmatrix}, \quad (9)$$
$$\bar{v}_3 = \begin{pmatrix} E_{s3} \\ E_{p3} \end{pmatrix}, \quad \bar{v}_4 = \begin{pmatrix} E_{s4} \\ E_{p4} \end{pmatrix}.$$

With the above definitions, the following matrix can be formed $$\begin{bmatrix} p & g \\ q & h \end{bmatrix} = [\bar{v}_1 \; \bar{v}_2]^{-1}[\bar{v}_3 \; \bar{v}_4] \quad (10)$$

where [x y] is a matrix with columns formed by the elements of the vectors x and y. Using the following set of definitions:

$$A = 1 - |p|^2 - |q|^2$$
$$B = 1 - |g|^2 - |h|^2$$
$$C = 2\text{Re}\lfloor p * q \rfloor$$
$$D = -2\text{Im}\lfloor p * q \rfloor$$
$$E = 2\text{Re}\lfloor g * h \rfloor$$
$$F = -2\text{Im}\lfloor g * h \rfloor$$
$$\begin{pmatrix} x \\ y \end{pmatrix} = \begin{pmatrix} C & D \\ E & F \end{pmatrix}^{-1} \begin{pmatrix} A \\ B \end{pmatrix}$$
$$\alpha = x + iy$$
$$\beta = \sqrt{1 - |\alpha|^2}$$
$$\hat{M} = \begin{pmatrix} 1 & \alpha \\ 0 & \beta \end{pmatrix} [\bar{v}_1 \; \bar{v}_2]^{-1}$$

$\alpha = x + iy$ the vector-calibration matrix is given by $$\hat{M} = \begin{pmatrix} 1 & \alpha \\ 0 & \beta \end{pmatrix} [\bar{v}_1 \; \bar{v}_2]^{-1}$$

Any measurement vector $\bar{v}_m = (2E_{mx} s \cos \phi_{mx}, 2E_{my} p \cos \phi_{my})$ can be corrected by performing the following multiplication $\bar{E} = \hat{M} \bar{v}_m$ where, after the above multiplication, E is guaranteed to be in some orthonormal basis.

Although the above-description is directed to the two polarization modes of standard optical fiber, optical fiber can support a variety of different modes. To handle that mode variety, one coupler and one detector would be added for each new mode present in the fiber. "Mode Controllers" corresponding to fiber loops (like the polarization controller loops) would also be used in each reference path. Calibration would be carried out using analogous linear algebra operations. The absence of stray reflections as described above means that the invention is particularly effective at measuring the very low scatter levels that come from the non-homogeneities in the optical fiber core. Optical-fiber, scatter-level measurements can be used to measure losses within an optical network independently of the manner of connection to the network.

While the invention has been described in connection with practical and preferred embodiments, the invention is not limited to the disclosed embodiments. On the contrary, the invention covers various modifications and equivalent arrangements included within the scope of the appended claims.

The invention claimed is:

1. A fiber optic measurement device comprising an optical frequency domain reflectometer (OFDR), comprising:
    a laser light source for generating light;
    a splitter for splitting the light from the laser and providing part of the light to a measurement path and part of the light to a reference path; and
    a polarization diversity detector for combining light from the measurement path that includes a first interference signal having a first polarization and light from the reference path that includes a second interference signal having a second different polarization,
    wherein the polarization diversity detector is configured to perform polarization diversity detection on the combined light that includes the first interference signal having the first polarization and the second interference signal having the second polarization without using a polarizing beam splitter.

2. The fiber optic measurement device according to claim 1, wherein the polarization diversity detector includes:
    a first coupler for receiving a first optical signal from a device or system under test and generating first and second coupler outputs;
    a second coupler for receiving a second optical signal from a reference source and generating third and fourth coupler outputs;
    a polarization controller (PC) for changing a polarization state of the third coupler output and generating a PC output;
    a third coupler for receiving the first coupler output and the PC output and generating a first combined output; and
    a fourth coupler for receiving the second coupler output and the fourth coupler output and generating a second combined output.

3. The fiber optic measurement device according to claim 2, further comprising:
    a first detector for detecting a first power of the first combined output in a first projection plane, and
    a second detector for detecting a second power of the second combined output in a second projection plane.

4. The fiber optic measurement device according to claim 3, further comprising:
    processing circuitry for processing interference terms of the first and second powers in the first and second projection planes to determine one or more characteristics of the first optical signal.

5. The fiber optic measurement device according to claim 4, wherein the fiber optic measurement device accounts for polarization of the first optical signal without using a polarizing beam splitter.

6. The fiber optic measurement device according to claim 4, further comprising:

a second polarization controller for changing a polarization of the first optical signal before being received in the first optical coupler, wherein the first and second polarization controllers are adjustable for calibrating the fiber optic measurement device, wherein for multiple different settings of the second polarization controller resulting in multiple corresponding vector measurements at the first and second detectors, the processing circuitry is configured to calculate a vector calibration matrix using the vector measurements.

7. The fiber optic measurement device according to claim 6, wherein the processing circuitry is configured to correct detected vector measurements using the vector calibration matrix such that the corrected vector measurements result in a vector representation of the first optical signal in an orthonormal basis.

8. A fiber optic measurement device comprising an optical frequency domain reflectometer (OFDR) configured to employ polarization diversity detection without using a polarizing beam splitter, comprising:
- a first coupler for receiving a first optical signal from a device or system under test and generating first and second coupler outputs;
- a second coupler for receiving a second optical signal from a reference source and generating third and fourth coupler outputs;
- a polarization controller (PC) for changing a polarization state of the third coupler output and generating a PC output;
- a third coupler for receiving the first coupler output and the PC output and generating a first combined output; and
- a fourth coupler for receiving the second coupler output and the fourth coupler output and generating a second combined output.

9. An optical frequency domain reflectometer (OFDR) configured to employ polarization diversity detection comprising:
- a first coupler for receiving a first optical signal from a device or system under test and generating first and second coupler outputs;
- a second coupler for receiving a second optical signal from a reference source and generating third and fourth coupler outputs;
- a polarization controller (PC) for changing a polarization state of the third coupler output and generating a PC output;
- a third coupler for receiving the first coupler output and the PC output and generating a first combined output;
- a fourth coupler for receiving the second coupler output and the fourth coupler output and generating a second combined output;
- a first detector for detecting a first power of the first combined output in a first projection plane;
- a second detector for detecting a second power of the second combined output in a second projection plane; and
- processing circuitry for processing interference terms of the first and second powers in the first and second projection planes to determine one or more characteristics of the first optical signal.

10. The OFDR according to claim 9, wherein the OFDR accounts for polarization of the first optical signal without using a polarizing beam splitter.

11. The OFDR according to claim 9, further comprising:
a second polarization controller for changing a polarization of the first optical signal before being received in the first optical coupler, wherein the first and second polarization controllers are adjustable for calibrating the fiber optic measurement device, and wherein for multiple different settings of the second polarization controller resulting in multiple corresponding vector measurements at the first and second detectors, the processing circuitry is configured to calculate a vector calibration matrix using the vector measurements.

12. The OFDR according to claim 11, wherein the processing circuitry is configured to correct detected vector measurements using the vector calibration matrix such that the corrected vector measurements result in a vector representation of the first optical signal in an orthonormal basis.

13. A method performed in an optical frequency domain reflectometer (OFDR), comprising:
- generating laser light;
- splitting the laser light;
- providing part of the laser light to a measurement path and part of the laser light to a reference path;
- processing light from the measurement path that includes a first interference signal having a first polarization and light from the reference path that includes a second interference signal having a second different polarization to perform polarization diversity detection on the combined light that includes the first interference signal having the first polarization and the second interference signal having the second polarization without using a polarizing beam splitter; and
- detecting one or more parameters of light from the measurement path based on the polarization diversity detection.

14. The method according to claim 13, wherein the processing includes:
- receiving at a first coupler a first optical signal from a device or system under test and generating first and second coupler outputs;
- receiving at a second coupler a second optical signal from a reference source and generating third and fourth coupler outputs.

15. The method according to claim 14, further comprising:
- changing in a first polarization controller a polarization state of the third coupler output and generating a changed third coupler output;
- receiving at a third coupler the first coupler output and the changed third coupler output and generating a first combined output; and
- receiving at a fourth coupler the second coupler output and the fourth coupler output and generating a second combined output.

16. The method according to claim 15, further comprising:
- detecting a first power of the first combined output in a first projection plane, and
- detecting a second power of the second combined output in a second projection plane.

17. The method according to claim 16, further comprising:
- processing interference terms of the first and second powers in the first and second projection planes to determine one or more characteristics of the first optical signal.

18. The method according to claim 17, further comprising:

changing in a second polarization controller a polarization of the first optical signal before being received in the first optical coupler;

for multiple different settings of the second polarization controller, generating multiple corresponding detected vector measurements;

calculating a vector calibration matrix using the vector measurements.

19. The method according to claim 18, further comprising:

correcting detected vector measurements using the vector calibration matrix such that the corrected vector measurements result in a vector representation of the first optical signal in an ortho-normal basis.

* * * * *